(12) United States Patent
Carley et al.

(10) Patent No.: US 11,349,574 B2
(45) Date of Patent: May 31, 2022

(54) OPTO-ELECTRONIC ASSEMBLY

(71) Applicant: HiLight Semiconductor Limited, Southampton (GB)

(72) Inventors: Carl Carley, Basingstoke (GB); William Redman-White, Alton (GB)

(73) Assignee: HiLight Semiconductor Limited, Hampshire (GB)

( * ) Notice: Subject to any disclaimer, the term of this patent is extended or adjusted under 35 U.S.C. 154(b) by 29 days.

(21) Appl. No.: 16/905,617

(22) Filed: Jun. 18, 2020

(65) Prior Publication Data
US 2021/0297162 A1    Sep. 23, 2021

(30) Foreign Application Priority Data

Oct. 8, 2019 (GB) .................................... 1914522

(51) Int. Cl.
*H04B 10/69* (2013.01)
*H04B 10/25* (2013.01)
*G02B 6/42* (2006.01)

(52) U.S. Cl.
CPC ............. *H04B 10/69* (2013.01); *H04B 10/25* (2013.01); *G02B 6/4201* (2013.01); *G02B 6/4204* (2013.01)

(58) Field of Classification Search
CPC ........ H04B 10/69; H04B 10/25; H04B 10/60; G02B 6/424; G02B 6/4281; G02B 6/423; G02B 6/4204; G02B 6/24; G02B 6/4201

(Continued)

(56) References Cited

U.S. PATENT DOCUMENTS 5,610,395 A * 3/1997 Nishiyama .......... H01L 31/0203
361/728
6,454,470 B1 * 9/2002 Dwarkin .............. G02B 6/4214
385/33

(Continued)

OTHER PUBLICATIONS

Great Britain Patent Application No. GB1914522.6, Combined Search and Examination Report under Sections 17 and 18(3), search report dated Nov. 21, 2019, 5 pages.

*Primary Examiner* — Abbas H Alagheband
(74) *Attorney, Agent, or Firm* — Squire Patton Boggs (US) LLP

(57) ABSTRACT

A construction and configuration for the receiving function of a high speed optical communication system with reduced manufacturing cost and improved performance. In an aspect, mounting the cover and lens provides a self-alignment behaviour that advantageously positions the cover and the lens to be in the optimum position for the photodiode. An assembly of electronic components receives data using an optical fibre. In one aspect, the assembly includes a photodiode, an amplifier coupled to the photodiode, and a printed circuit board on which the photodiode and amplifier are physically mounted, The printed circuit board has areas of a first material to which components may be attached using a fixing agent, and areas of a second material to which components will not attach using the fixing agent. Conductive bond wires are configured to directly couple the amplifier and the photodiode to conductive traces on an opposite side of the printed circuit board. A cover is configured to cover the amplifier and the photodiode, and is physically attached to the printed circuit board to provide mechanical rigidity around the photodiode and the amplifier. The cover has an optically transparent aperture containing a lens configured to focus modulated light signals from a fibre onto the photodiode. The printed circuit board has areas of a first (Continued)

material and second material configured to fix a location of the cover by use of the fixing agent to align the lens to focus the light signals from the fibre onto the photodiode.

20 Claims, 11 Drawing Sheets

(58) Field of Classification Search
USPC .......................................................... 398/79
See application file for complete search history.

(56) References Cited

U.S. PATENT DOCUMENTS

| | | | |
|---|---|---|---|
| 7,476,040 B2* | 1/2009 | Zack .................... | G02B 6/4279 |
| | | | 385/93 |
| 8,457,454 B1* | 6/2013 | Roy ..................... | G02B 6/4279 |
| | | | 385/33 |
| 9,063,309 B2* | 6/2015 | Scofet .................. | G02B 6/4281 |
| 9,400,359 B1* | 7/2016 | Fu .......................... | G02B 6/428 |
| 10,001,611 B2* | 6/2018 | Ding ....................... | H01L 23/48 |
| 10,120,150 B2* | 11/2018 | Ding ........................ | G02B 6/30 |
| 10,139,578 B2* | 11/2018 | Huang ................... | H04B 10/40 |
| 2004/0105627 A1* | 6/2004 | Hargis ................. | G02B 6/4201 |
| | | | 385/88 |
| 2005/0062117 A1* | 3/2005 | Gallup ................. | G02B 6/4204 |
| | | | 257/414 |
| 2005/0185882 A1* | 8/2005 | Zack .................... | G02B 6/4256 |
| | | | 385/15 |
| 2010/0025846 A1* | 2/2010 | Nishiyama .......... | H01S 5/02253 |
| | | | 428/595 |
| 2017/0315313 A1* | 11/2017 | Cheng ................. | G02B 6/4263 |
| 2018/0292078 A1* | 10/2018 | Zheng ...................... | F21V 5/04 |

\* cited by examiner

OPTO-ELECTRONIC ASSEMBLY

FIELD OF THE INVENTION

The present application relates to opto-electronic assemblies and receive optical sub-assembly construction with self-aligning lens cap attachment for chip-on-flex assembly.

BACKGROUND OF THE INVENTION

High speed optical communication links comprise many optical, electronic and opto-electronic components and assemblies wherein electrical signals are converted into optical signals for transmission over a fibre; and where optical signals conveyed by means of a fibre are converted to an electrical signal and subject to amplification and further processing. Common requirements for the components and assemblies used in such links are that the cost be minimised, while at the same time the performance is to be maximised.

This invention is concerned with that part of an optical communications system wherein an optical signal is received and converted into an electrical signal and subject to amplification and possibly also subject to other signal processing functions before being conveyed to other components of the complete signal chain. The receive functions in one sub-assembly may in some cases be combined with transmit functions contained in another sub-assembly into a larger assembly. The features of the invention to be described are applicable for an assembly intended for the receive path of an optical communications system or for use in a combined assembly for both receive and transmit paths, and where the description refers to a receive function, it should be taken that the features may also be used in a combined assembly.

Such a receive path component is commonly called a Receive Optical Sub-Assembly or ROSA, and may comprise a photodiode and an associated amplifier, typically a transimpedance amplifier, possibly with an associated internal limiting amplifier. The associated amplifier is typically mounted close to the photodiode in order to maximise the bandwidth of the complete system. Conventionally the photodiode and the amplifier are mounted in a metal can wherein the external electrical connections are provided by means of wire leads that feed through insulating regions in the base of the can and wherein said leads further provide posts within the can to which wires may be bonded. These wires may also be bonded to pads on the amplifier integrated circuit and also on to pads on the photodiode. By these means power, monitoring, control and signal paths are established. The wire leads from the can are then connected to a flexible printed circuit board (PCB) and this flexible board is further connected to the main electrical functions of a receiver module.

Such metal cans represent a significant proportion of the total cost of the ROSA. Further, there is an inherent impediment to achieving the highest possible operating bandwidth since it is necessary for the high data rate output signals from the amplifier to pass in turn through bond wires, header posts, lead wires and then via conductive traces in a flexible PCB before being communicated to the next electronic functions in the signal chain.

It is possible for manufacturing and assembly costs to be reduced and at the same time for high frequency performance to be improved by means of mounting the electronic components in the ROSA directly on the flexible PCB and thereby reducing the overall length of the signal path for the received signals. However, in a practical implementation of such an assembly it is necessary to provide a cover for the said electronic components and the photodiode where said cover also provides an optical aperture containing the lens used to focus light from the fibre onto the photodiode. In addition, there is a requirement to provide mechanical support for the electronic and optoelectronic components on the flexible PCB. Without such support, there is a possibility that there will be failures in connections or in the adhesion of the said components to the PCB. There is also a need to provide means for aligning the said lens with the sensitive region of the photodiode, and securing this in position during the operational deployment. Any means of attaching said cover and lens assembly to the PCB to fulfil these requirements should preferably meet the further requirements of being low cost and reliable and be achieved by means of assembly methods compatible with conventional PCB manufacturing processes.

SUMMARY OF THE INVENTION

It is an object of the invention to provide means of construction and configuration for the receiving function of a high speed optical communication system wherein manufacturing cost is reduced compared with prior art. It is a further object of the invention to provide a construction and configuration for the receiving function of a high speed optical communication system wherein improved performance can be achieved compared with prior art.

A benefit of the invention is that the requirement to use fully enclosed cover for the mounting of the photodiode and the associated amplifier is avoided by mounting the principal electronic components directly on the flexible PCB.

A further benefit of the invention is that the cover and lens can be securely mounted on the flexible PCB to provide local mechanical stiffness to reduce the risks of deformation of the PCB that could lead to misalignment or breakage.

A yet further benefit is that the means for mounting the cover and lens provides a self-alignment behaviour that advantageously positions the cover and the lens to be in the optimum position for the photodiode.

According to a first aspect of the invention there is provided an assembly of electronic components providing means for reception of data using an optical fibre wherein said assembly comprises: a photodiode; an amplifier coupled to said photodiode; a printed circuit board, said photodiode and amplifier physically mounted on said printed circuit board; wherein said printed circuit board has areas of a first material to which components may be attached using a fixing agent, and areas of a second material to which components will not attach using said fixing agent; conductive bond wires configured to directly couple said amplifier and said photodiode to conductive traces on an opposite side of said printed circuit board with respect to the said amplifier and said photodiode; a cover, said cover configured to cover said amplifier and said photodiode, wherein said cover is physically attached to said printed circuit board so as to provide mechanical rigidity around said photodiode and said amplifier, and said cover having an optically transparent aperture containing a lens configured to focus modulated light signals from a fibre onto said photodiode, wherein said printed circuit board has areas of a first material and second material configured to fix a location of said cover by use of said fixing agent such that said lens is aligned to focus said light signals from said fibre onto said photodiode.

The assembly may comprise further ancillary electronic components mounted on said printed circuit board and covered buy said cover.

The area of said first material may have a region that substantially matches an outline of said contact region of a base of said cover and said region of said pattern of said first material is bounded on its inside and outside edges by areas of said second material.

The fixing agent may have a significant surface tension at a time of initial attachment before becoming cured or set.

The areas of the said first material and said second material may be arranged in a concentric manner around a location of said photodiode.

The metal can may comprise one of: a metal can structure; and a plastic can structure.

The printed circuit board may be a flexible printed circuit board.

The areas of said second insulating material bordering said region of said first conductive material to which said cover and lens are to be attached are separated to provide a continuous region of said first conductive material over signal traces on an opposite side of said printed circuit board.

The said areas of insulating material bordering said area of conductive material to which the cover is to be attached may be separated so as to provide a continuous region of conductive material disposed symmetrically opposite said continuous region of conductive material claimed in claim 10 with respect to a position of the photodiode.

The electrical connections between electronic and optoelectronic components within said cover and said traces on the opposite side of the printed circuit board with respect to said components may be made by means of one of: at least one plated through holes; at least one hole through which a bond wire is connected.

The said conductive traces may be laid out in a manner that minimises impedance discontinuities in an electrical path between said electronic components and an edge of said printed circuit board.

According to a second aspect of the invention there is provided a method of assembly of electronic components to provide means for reception of data using an optical fibre, said method comprising: providing a printed circuit board; physically mounting on said printed circuit board a photodiode and an amplifier; providing on said printed circuit board at least one conductive trace from an edge of said printed circuit board to the at least one region of said board on which said amplifier and said photodiode are mounted; providing on said printed circuit board holes through said board configured to provide means of electrical connection between opposite sides of said printed circuit board; providing a cover for said photodiode, said cover having an optically transparent aperture containing a lens configured to focus modulated light signals from a fibre onto said photodiode, and said cover being configured to be able to be attached to areas of printed circuit board by means of a fixing agent; providing on said printed circuit board areas of a first material and areas of a second material configured for the attachment of said cover wherein said fixing agent can adhere to said first material and wherein said fixing agent will not adhere to said second material, and wherein said areas of said first material and said second material are disposed on the printed circuit board so as the fix the position of said cover when said cover is attached to said printed circuit board so that the said lens in said cover will be correctly aligned with said photodiode; physically attaching said cover to said areas of said first material on said printed circuit board using said fixing agent and over said photodiode, said cover being configured to provide mechanical rigidity around said photodiode and said amplifier; coupling said amplifier and said photodiode to said conducting traces on said printed circuit board.

The method may provide for a cover configured to cover said photodiode and said amplifier.

The method may provide for a cover configured to cover ancillary electronic components on said printed circuit board.

The method may provide for a cover comprising one of: a metal can structure; a plastic can structure.

The method may provide for a flexible printed circuit board.

The method may provide for said first material on said printed circuit board comprising a layer of metal, said metal being compatible with soldering, and said second material on said printed circuit board comprising an insulating substrate material.

The method may provide for attaching said cover to said printed circuit board by means of one of: a fixing agent; an adhesive; solder.

The method may provide for configuring said adhesive so as to provide significant surface tension effects before curing or setting when applied in liquid form to said areas of said first material and when applied in liquid form to said cover.

The method may provide conductive traces on an opposite side of said printed circuit board wherein said photodiode is attached.

The method may provide for forming least one hole within the region of said printed circuit board covered by said cover.

The method may provide for making connections between said conductive traces and said photodiode and said amplifier via at least one hole in said printed circuit board.

The method may provide for forming said conductive traces in a manner that minimises impedance variations and discontinuities in an electrical path between said electronic components and an edge of said printed circuit board.

The method may provide for configuring areas of the said second material such that there are continuous areas of said second material on either side of an area of said first material, and said area of said first material may be configured to be of substantially the same outline as the contact region for the attachment of the said cover.

The method may provide for configuring said areas of the said second material such that there are areas of said second material symmetrically disposed on either side of an area of said first material, and configuring said area of said first material to be of substantially the same outline as the contact region for the attachment of the said cover, and further configuring said areas of said second material so as to provide a continuous area of said first material above said conductive traces, said continuous areas being such as to provide an electrical ground plane for said traces.

BRIEF DESCRIPTION OF THE DRAWINGS

The invention will now be described solely by way of example and with reference to the accompanying drawings, in which.

Note that the description is not to be taken in a limiting sense but is made merely for the purposes of describing the general principles of the embodiments of the invention.

DETAILED DESCRIPTION

Figure 1:
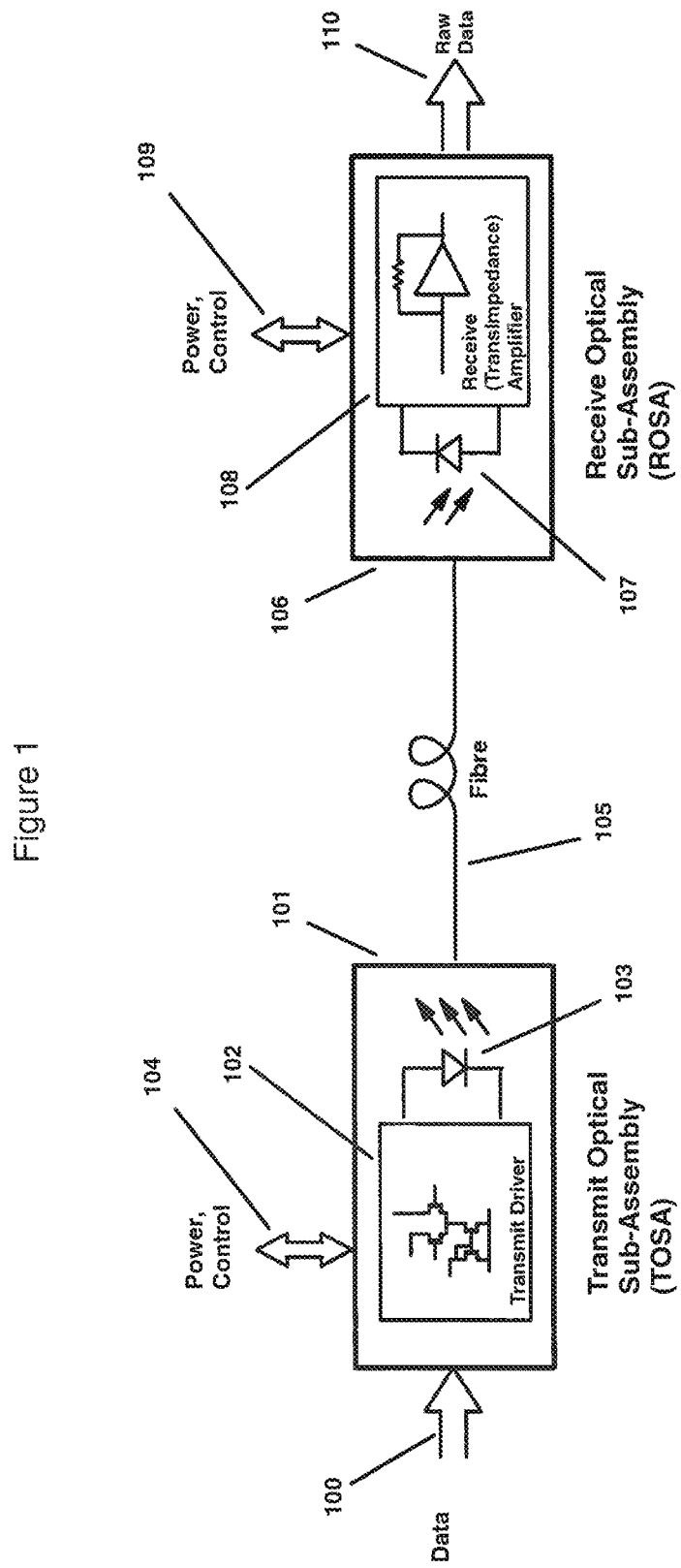
FIG. 1 shows a fibre optical communications system according to prior art.

FIG. 1 shows the basic system level configuration of a generic optical communications physical link, wherein electrical data signals 100 containing information are converted to optical signals in a Transmit Optical Sub-Assembly (TOSA) 101, where said TOSA may be comprised of driver electronics 102 and typically a laser diode 103 or other electro-optical conversion device. The driver electronics provide the laser diode (or alternative device) with appropriate current waveforms necessary to create the desired optical signal representing the electrical data signals. There may be constraints imposed in order to respect further requirements imposed by agreed performance standards and specifications. The driver electronics may be a combination of components or have nearly all the necessary functions integrated in a single integrated circuit (IC). The TOSA will also have additional connections 104 to provide power supplies and may also have control and monitoring inputs and outputs.

After travelling along the fibre 105, the optical signal is converted back to an electrical signal representing the data in a Receive Optical Sub-Assembly (ROSA) 106. Said ROSA may be comprised of a photodiode 107 to perform the basic conversion of the optical signal into an electrical signal, where said photodiode is coupled to an amplifier 108, typically, though not exclusively, a transimpedance amplifier (TIA), in order to deliver a usefully large raw data signal 110 that may be conveyed to electronic components and systems for further processing. The amplifier 108 is typically mounted very close to the photodiode 107 in order to minimise stray capacitance and inductance effects that could have detrimental impacts on the speed of operation. The ROSA will also have additional connections 109 to provide power supplies and may also have control and monitoring inputs and outputs. The output 110 of said amplifier is typically passed to a limiting amplifier wherein the magnitude of the signal is raised and compensation made for variations in the strength of the optical signal in order to make it suitable for further processing, often by digital circuits.

Figure 2:
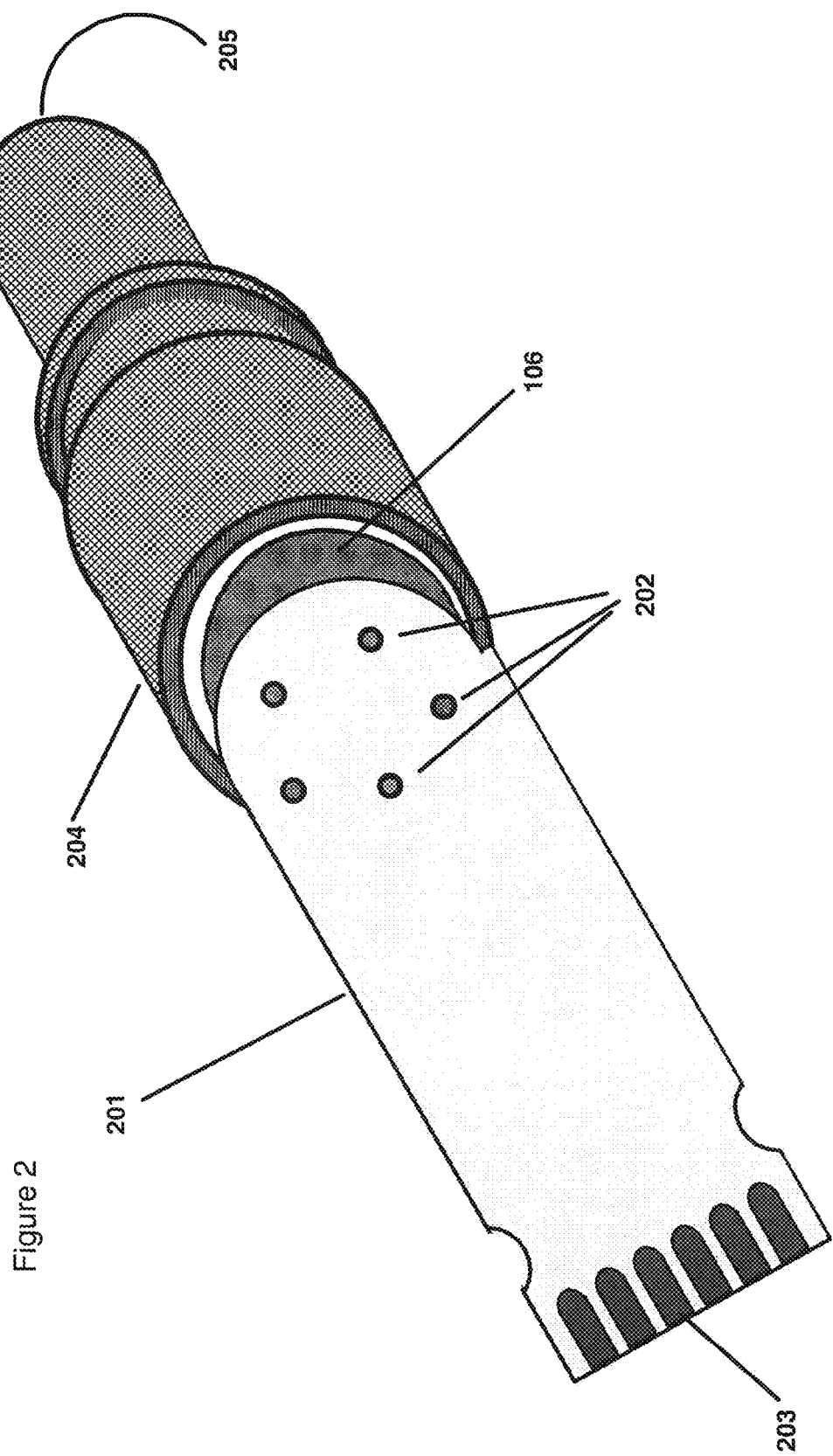
FIG. 2 shows a view of a ROSA mounted on a flexible PCB for use in a fibre optical communications receiver according to prior art.

FIG. 2 shows a diagrammatic representation of a ROSA 106 mounted on a flexible printed circuit board (PCB) 201 where in this view represented in the figure, the aperture for the fibre 205 to provide the optical input for the ROSA is facing away. In order to allow for the alignment of the ROSA with the incoming fibre 105 and thus couple the optical signal effectively to the sensitive face of the photodiode 107 it is commonplace to mount the ROSA on a flexible printed circuit board (PCB) with wire leads from the ROSA soldered into holes in the PCB 202. Said PCB 202 typically carries no components apart from the ROSA and is usually solely employed for coupling the signal and power connections 109, 110 from the ROSA to the host electronic system, with an array of edge connections 203 typically provided at one end of the said PCB. The ROSA itself typically has an overlay tube structure (sometime described as a ferrule) 204 attached thereto that forms part of the means for connecting and aligning the fibre 105 with the photodiode 107 contained in the ROSA.

Figure 3:
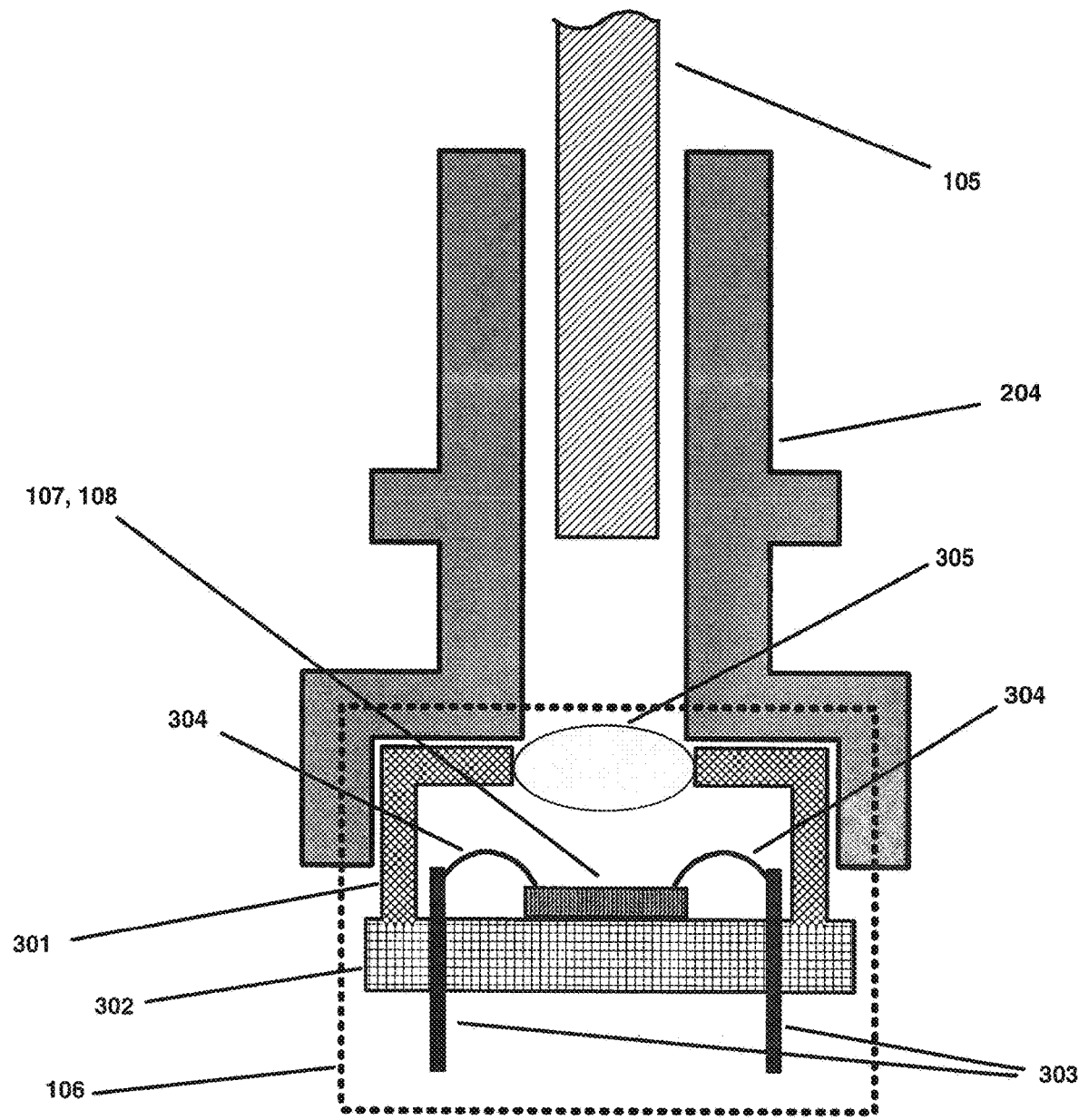
FIG. 3 shows a further view of a ROSA and the associated fibre connection for use in a fibre optical communications receiver module according to prior art.

FIG. 3 shows a cross-sectional view of a typical ROSA 106 construction together with the associated components used to connect and align the fibre 105 with the photodiode 107 contained in the ROSA. The ROSA itself is typically housed within a metal can 301 similar to those used to house discrete transistors, often referred to as "TO" cans. Said cans are typically of the order of 5 mm in diameter and 3 mm in height not including the electrical leads. The base of the can 302 may be of an insulating material or have insulating regions allowing conducting leads 303 to pass through to the internal cavity of the can. The photodiode 107 and (transimpedance) amplifier 108 are mounted within the can (in this figure these components are one behind the other and thus not represented individually) and electrical connections made to the leads 303 by means of bond wires 304. Said bond wires are typically gold wires of the order of one or two millimetres in length. At the top of the can there is typically an opening into which is mounted a lens 305 employed to focus the light from the fibre onto the photodiode. Note that in FIG. 3 there are spaces shown between the fibre alignment ferrule 204 and the ROSA can 301, as well as between the fibre alignment ferrule and the incoming fibre 105, but these spaces are merely to show the individual components more clearly. In a practical implementation it will be obvious to one of ordinary skill in the arts that the fibre alignment ferrule 204 will be made to be a close fit over the ROSA can 301 and similarly a close fit for the fibre 105 in order to ensure correct alignment of the fibre with the ROSA's optical aperture and lens 305.

Figure 4:
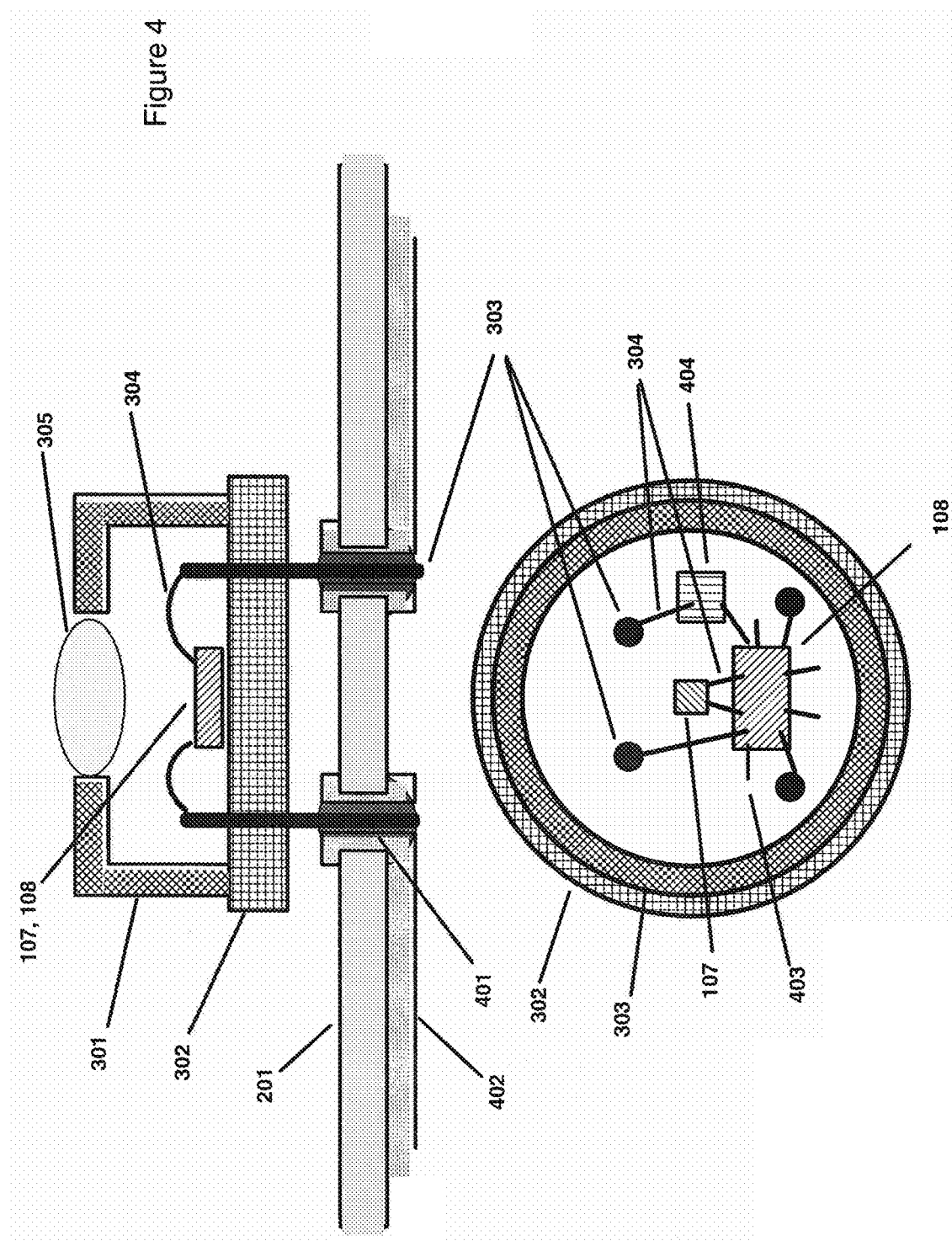
FIG. 4 shows cross sectional and top views of a ROSA according to prior art.

FIG. 4 shows further views of a typical ROSA and its conventional method of mounting on the flexible PCB both in cross section and in top view. The cross sectional view (above) shows the ROSA mounted on the flexible PCB 201. The ROSA leads 303 are connected to the conductive traces 402 of the flexible PCB typically by means of soldered connection to plated-through-hole vias 401 in the PCB. These traces carry the various signals and power paths to and from the edge connector 203 on the PCB. In the top view (below) an example is given of the possible disposition of the internal components comprised within the ROSA. Mounted on the ROSA base and typically placed at the centre is the photodiode 107, which is further connected electrically to the (transimpedance) amplifier 108 by means of bond wires 304. The amplifier, typically an integrated circuit, has further bond wire connections to the header posts of the leads 303 and also typically to a grounded conducting region on the ROSA can base 403, often referred to as down-bonds. There may also be additional components housed within the ROSA can, for example, a capacitor 404 for decoupling or other purposes.

It will be apparent to one of ordinary skill in the arts that the signal path from the (transimpedance) amplifier 108 to the edge connector 203 of the flexible PCB comprises several different parts, for example, from the amplifier integrated circuit through a bond wire 304 to the ROSA lead 303, and thence to a though-hole via 401 in the PCB, and thence through a conducting trace 402 on the PCB. At each change in the signal path medium there will inevitably be some change in the characteristic impedance experienced by the signal, and with various different reflection and attenuation characteristics evident. At the desired operating data rates for such optical communications, typically up to 10 s of Gbits/s, such effects can have a significantly detrimental impact on signal transmission. A further issue is that there is a significant cost associated with the construction of the ROSA both in parts for the can and in labour, in addition to the cost of assembling the complete ROSA on to the flexible PCB.

Figure 5:
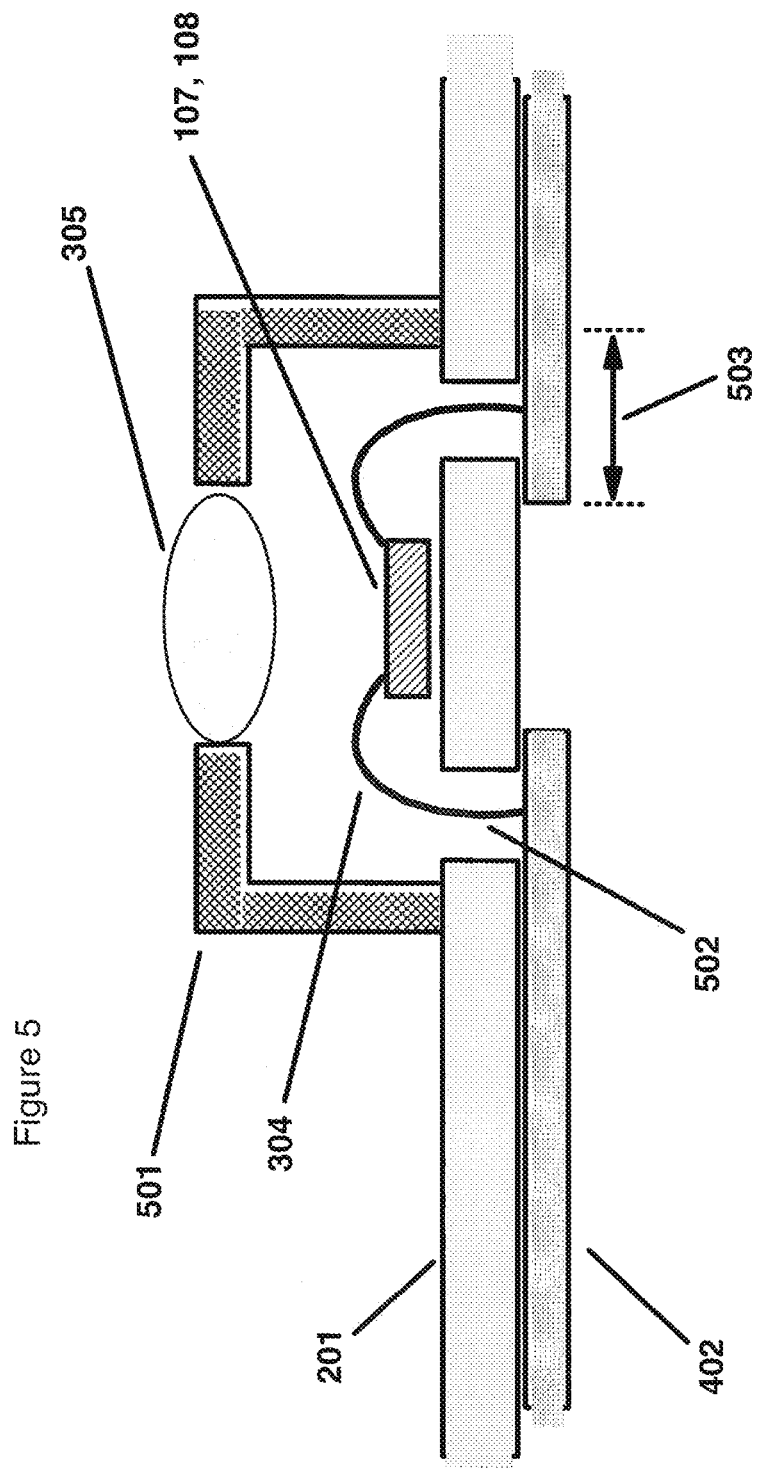
FIG. 5 shows an assembly of components for part of a fibre optical receiver configured according to an embodiment of the present invention.

FIG. 5 shows an exemplar arrangement for an alternative form of ROSA that seeks to improve on some of the shortcomings of the previously described prior art. The ROSA can base 302 and the metal leads 303 (as shown in FIGS. 3 and 4) are no longer required for this arrangement, and the photodiode 107 and the (transimpedance) amplifier 108 have been mounted directly on the flexible PCB 201. A new form of cover 501 which also holds the lens 305 in an opening in same is attached to the PCB 201 over the photodiode 107 and the amplifier 108. This direct attachment also provides essential mechanical stiffness that avoids distortion of the optical alignment and damage to the internal assembly and electrical connections. The cover 501 is placed so that the lens 305 aligns correctly with the photodiode 107 for optimum sensitivity. In the prior art as exemplified in FIG. 4 the ROSA 106 was attached to the flexible PCB by means of the ROSA leads 303 which also provided the electrical power and signal paths. In the new arrangement shown in FIG. 5 these leads are not present and the electrical connections from the amplifier 108 and other components in the ROSA to the conducting traces 402 of the flexible PCB are made more directly. Holes 502 are cut in the insulating layer of the PCB 201, typically a polyimide material, so that suitably located areas 503 of the conductive traces (typically copper) on the back side of the PCB are now accessible. With a hole of sufficient size, it is now possible to connect a bond wire 304 directly from the amplifier 108 or other component within the ROSA to the corresponding conducting trace 402. In this way the characteristic impedance discontinuities and parasitic impedances present in the signal paths will be further reduced and so allow improved high frequency performance to be achieved.

The holes 502 in the PCB 201 are obviously required to be of sufficient diameter to permit the bond wires leading from the amplifier and other components to be placed and secured on the conductive traces 402 on the back of the PCB. In practice, the diameter of said holes need not be excessively large, and in practice it is possible to place sufficient holes within the diameter of a conventional ROSA and still have ample space on the PCB surface within the ROSA cover 501 to place the photodiode 107 correctly and to place the amplifier 108 as well as any necessary ancillary components. In order for the conductive traces 402 to remain securely affixed to the back of the PCB during and after the wire bonding process, it is necessary to provide some mechanical support for the traces. To satisfy this requirement, one method of providing sufficient support is to make the ends of the traces 503 of a larger diameter than the holes 502 cut for the bond wires 304 such that this region 503 of the conductive trace has support around the entire periphery of the hole 502. The layout of the traces from the holes to the edge of the flexible PCB may then be laid out in such a manner as to ensure that the characteristic impedance is maintained as close to the ideal desired value as possible.

The means by which the cover 501 is securely mounted onto the PCB 201 is clearly an issue that must be given due attention during the manufacturing process. Firstly, the method of attachment must be sufficiently strong to provide the required mechanical rigidity to the region of the PCB on which the photodiode and the (transimpedance) amplifier are mounted. Secondly, the lens 305 must be correctly aligned so that light from the fibre 105 is concentrated on the sensitive area of the photodiode 107. Finally, the abovementioned results should preferably be achieved reliably and in a manner consistent with conventional assembly techniques and requiring minimal extra labour, equipment or materials.

Figure 6:
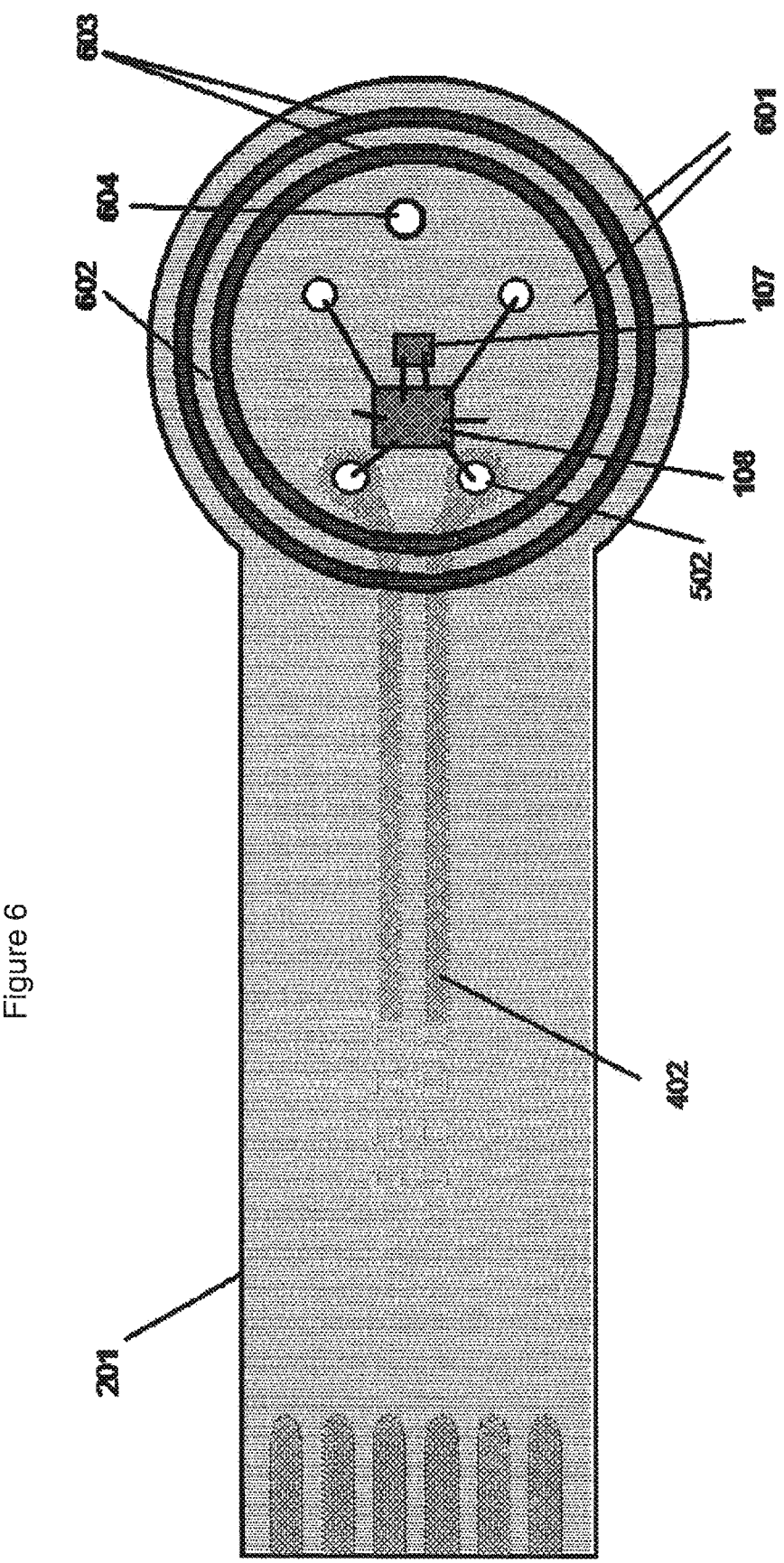
FIG. 6 shows a further assembly of components for part of a fibre optical receiver configured according to an embodiment of the present invention.

It is an object of the invention to provide methods for the assembly of such a ROSA construction that these goals are substantially met in an advantageous manner as is presented with reference to FIG. 6 onwards.

FIG. 6 shows a top view of an exemplar arrangement according to some embodiments of the invention for part of an alternative form of an optical receiver assembly without the cover 501 attached that seeks to improve on some of the shortcomings of the previously described prior art. The normal components forming the electronic functions of the receiver, for example, the photodiode 107 and the (transimpedance) amplifier 108 are mounted at the end of the PCB in the centre of a region that is of a defined shape and size, sufficiently large that this said region can accommodate the said components and the said cover. Connections from these said electronic components to the signal and power conductive traces 402 located on the back of the PCB 201 are made by means of holes through the PCB as described with reference to FIG. 5.

It will be apparent to one of ordinary skill in the art that a particularly convenient embodiment will arrange for this region to be substantially circular in form, and in the descriptions hereinafter the shape of this region and the patterning of the layers on the surface of said region are described in terms of being substantially circular forms. It is to be understood that this region wherein the ROSA components and the associated cover are mounted, may take other geometric forms without departing from the spirit and scope of the invention; for example, an octagonal form may be used without significant disadvantage.

A proportion of the top surface of the PCB 201 is coated where appropriate, with a first layer of a first material 601 to which a means of attachment of the cover 501 will adhere. Furthermore the PCB 201 also comprises a second layer of a second material under the said first layer, and to said second layer a means of attachment of the cover 501 will not adhere. Said first layer may be removed in defined patterns by etching or other appropriate means to expose defined patterns of said second layer, and where said second layer of said second material is exposed, said means of attachment for the cover will not adhere. Although the examples shown herein present a situation wherein the first layer is etched to reveal the second layer, it is understood that in some embodiments the first layer may be deposited onto the second layer using any suitable known assembly process. In some further alternative embodiments the second layer may be deposited onto the first layer using any suitable known assembly process.

In many embodiments of the invention, it will be further apparent to one of ordinary skill in the art that it will be advantageous for the said first layer of said first material 601 to be a conducting material, typically copper, to which solder (which may be used in some embodiments as the means of attachment) will adhere when appropriately heated during a conventional PCB assembly process, and it said second layer of said second material will be the insulating substrate of the PCB.

It will be further apparent to one of ordinary skill in the art that it will be advantageous in many embodiments of the invention for the said region of the said first layer of said first material 601, to be of a conducting material in order to be able to provide an electrical ground plane for the electronic and optoelectronic components of the ROSA placed in said region, and where direct electrical connections to said electrical ground plane may be advantageous. Note that the descriptions of the embodiments hereinafter refer to the said first layer 601, and patterned regions derived therefrom by etching or other methods, as being of a conducting nature, but it is to be understood that this is not an exclusive requirement for all embodiments of the invention.

The said first layer of said first (conductive, copper) material 601 may be patterned using etching or other conventional techniques in such a way so that a ring (or other convenient shape) of the said first layer of said first material 602 surrounds the electronic components, with the centre of said ring corresponding to the location of the sensitive region of the photodiode 107. On either side of said ring (or other convenient shape) 602 of the said first layer of said first (conductive) material, the said first layer has been removed by etching or other suitable means to reveal the said second layer of said second (insulating substrate) material in the form of concentric rings (or other convenient shape) 603. Patterning the said first (conductive) layer in this way provides a means for the attachment of a cover 501 constructed of a suitable metal by means of a soldering process. Use of soldering for the means of attachment ensures that the attachment of the cover 501 is mechanically secure and provides excellent rigidity to the region of the PCB on which the electronic components are mounted. Furthermore, attaching the cover in this way also provides a means for the precise location of the said cover such that the correct alignment of the lens 305 with the photodiode 107 is achieved.

Note that where other materials are chosen for the said cover 501 and for the associated patterned regions of the said first layer 602 and the patterned regions of the said second layer 603, the means of attachment will need to be determined as suitable. Further, the means of attachment to the patterned region of said first layer 602 should have properties such that said means of attachment does not adhere to the patterned regions of the said second layer 603 where the said layer 601 has been removed, or in other embodiments, where the said second layer of said second material has been deposited.

Figure 7:
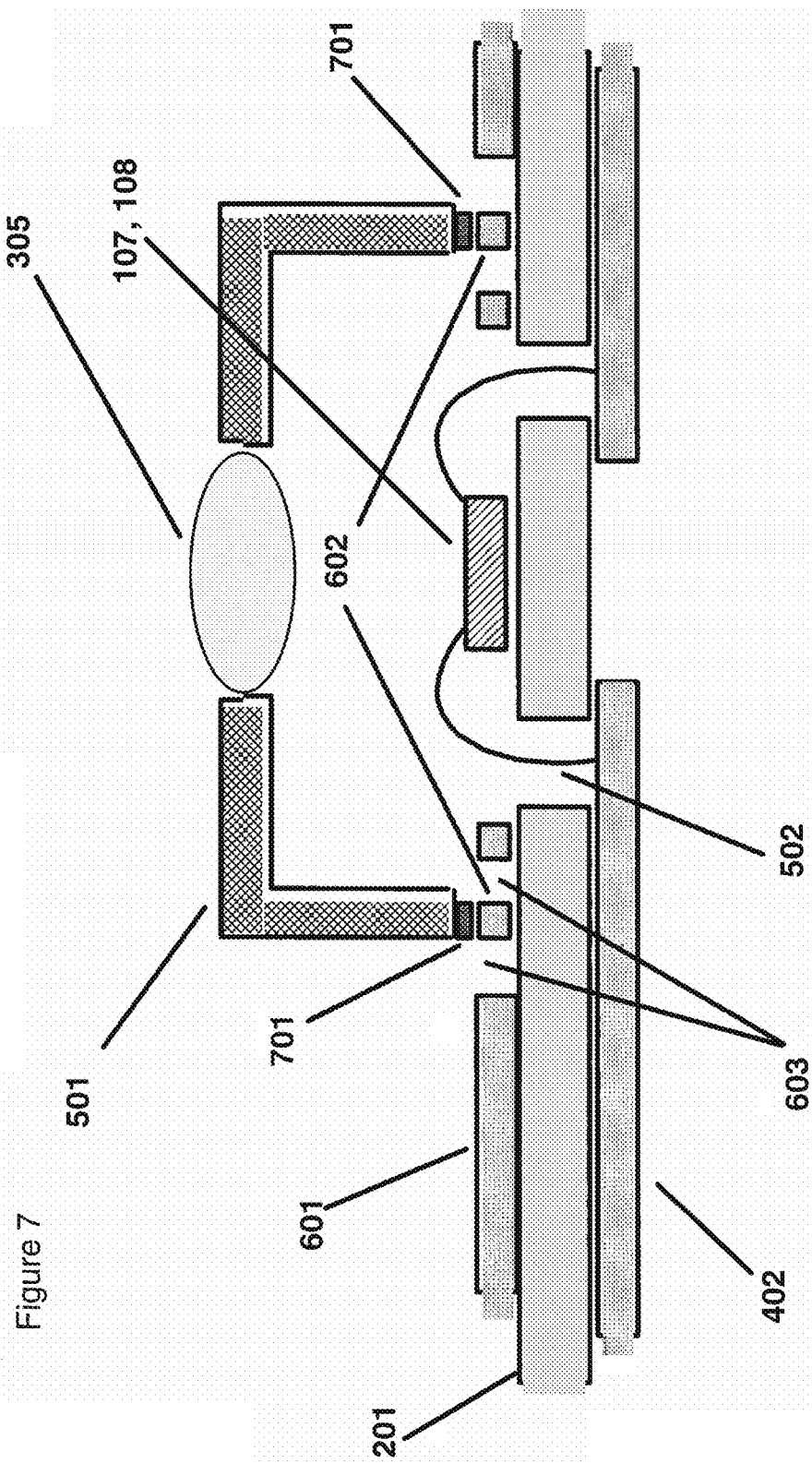
FIG. 7 shows a cross sectional view of an assembly of components for part of a fibre optical receiver configured according to an embodiment of the present invention.

FIG. 7 shows a cross sectional view of an arrangement according to some embodiments of the invention. In this figure, the ring (or other convenient shape) 602 formed in the said first layer of said first (conductive) material 601 is shown clearly defined by the gaps 603 in the conductive layer exposing the said second layer of said second material in defined regions on either side of said ring. The (metal) cover 501 covering the electronic and optoelectronic components is attached to the said ring 602 of said first layer of said first material by means of a solder bond (or by other means). In order for this soldering process to achieve the precise location of the cover on the defined ring of the conductive layer, the solder is provided for the formation of the bond in the form of a pre-stamped ring of solder 701 placed on the ring of the said first layer of said first (conductive) material 602 prior to placement of the said cover 501 and then the subsequent application of heat. It will be apparent to one of ordinary skill in the art that when the solder ring 701 melts and becomes liquid, it will exert a force on the said cover 501 due to the surface tension of the molten metal. Given the circular (or other convenient) shape of the said cover 501 and the circular (or corresponding other convenient) shape of the said first layer of said first (conductive) material layer patterned as in the form of a ring 602, the forces exerted will be such as to arrive at an equilibrium where the said cover 501 is precisely concentrically located on the ring 602 of the said first layer of said first conductive material. When the solder cools and solidifies, the location of the cover is then automatically fixed so that the lens 305 is correctly aligned with the photodiode 107 without any requirement for further adjustment or other actions from an assembly operative.

Figure 8:
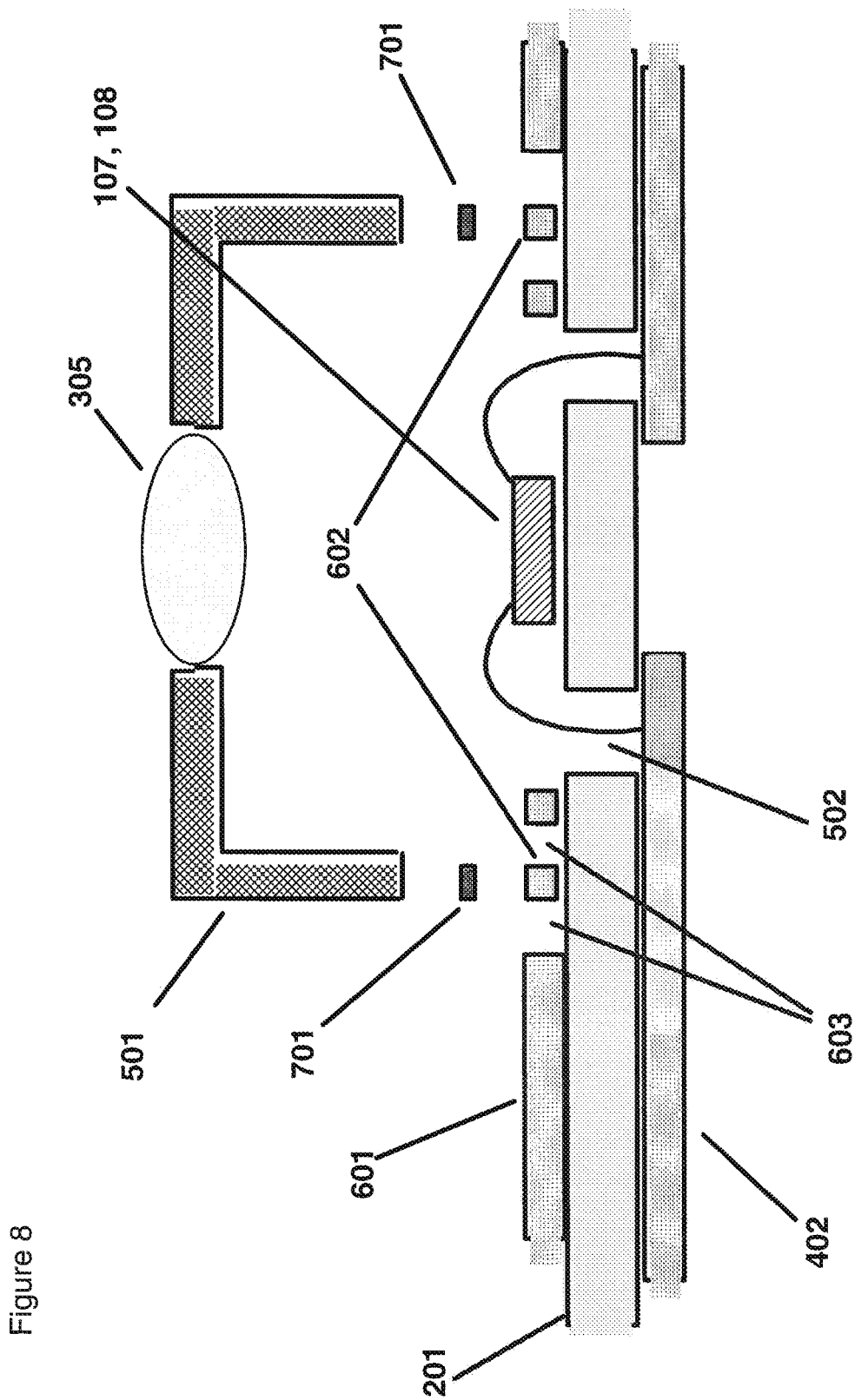
FIG. 8 shows a cross sectional view of the means of assembling an assembly of components for part of a fibre optical receiver configured according to an embodiment of the present invention.

FIG. 8 shows in more detail a cross sectional view of some embodiments of the invention showing a manner in which parts of the arrangement shown in FIG. 7 may to be assembled. The pre-formed stamped ring of solder 701 is seen to be of substantially the same diameter as the ring of the said first layer of said first (conductive) material 602, and also of substantially the same diameter as the base of the said cover 501. These parts are brought together and heated in a conventional soldering production process to form a solder bond between the said ring of the said first layer and the said cover 501.

It is advantageous to avoid the use of conventional soldering flux during the formation of this bond to avoid contamination of the electronic and optoelectronic components comprised in the arrangement. As will be well known to one of ordinary skill in the art, common soldering flux formulations may give rise to contamination of components in the region near to the formation of the solder bond. If said solder bond has exposed areas within the confined space of the cover 501, then contaminating products will become trapped and have potentially long term reliability issues. A preferred method of assembly to avoid such risks is to use a pre-formed ring shaped stamping of solder without any flux, and to perform the heating and bonding process in an inert or non-oxidising atmosphere, for example in a dry Nitrogen atmosphere. An alternative method of forming the solder bond without a conventional flux is with the use of formic acid. Other methods are also possible.

It is also advantageous during the assembly and solder bonding process to provide means by which gas pressure within the said cover 501 may be equalised with the external environment during and after the heating and soldering process. It will be apparent to one of ordinary skill in the art that a significant pressure difference between the internal cavity of the cover 501 and the external environment can arise during and after the heating and soldering process. Such a pressure difference is likely to lead to distortion of the PCB 201 under the cover 501 with attendant risk of misalignment between the lens 305 and the photodiode 107 and further, lead to a possibility of mechanical failure. One method to resolve this problem is to provide a venting hole in the PCB 201 in the region under the cover 501.

Figure 9:
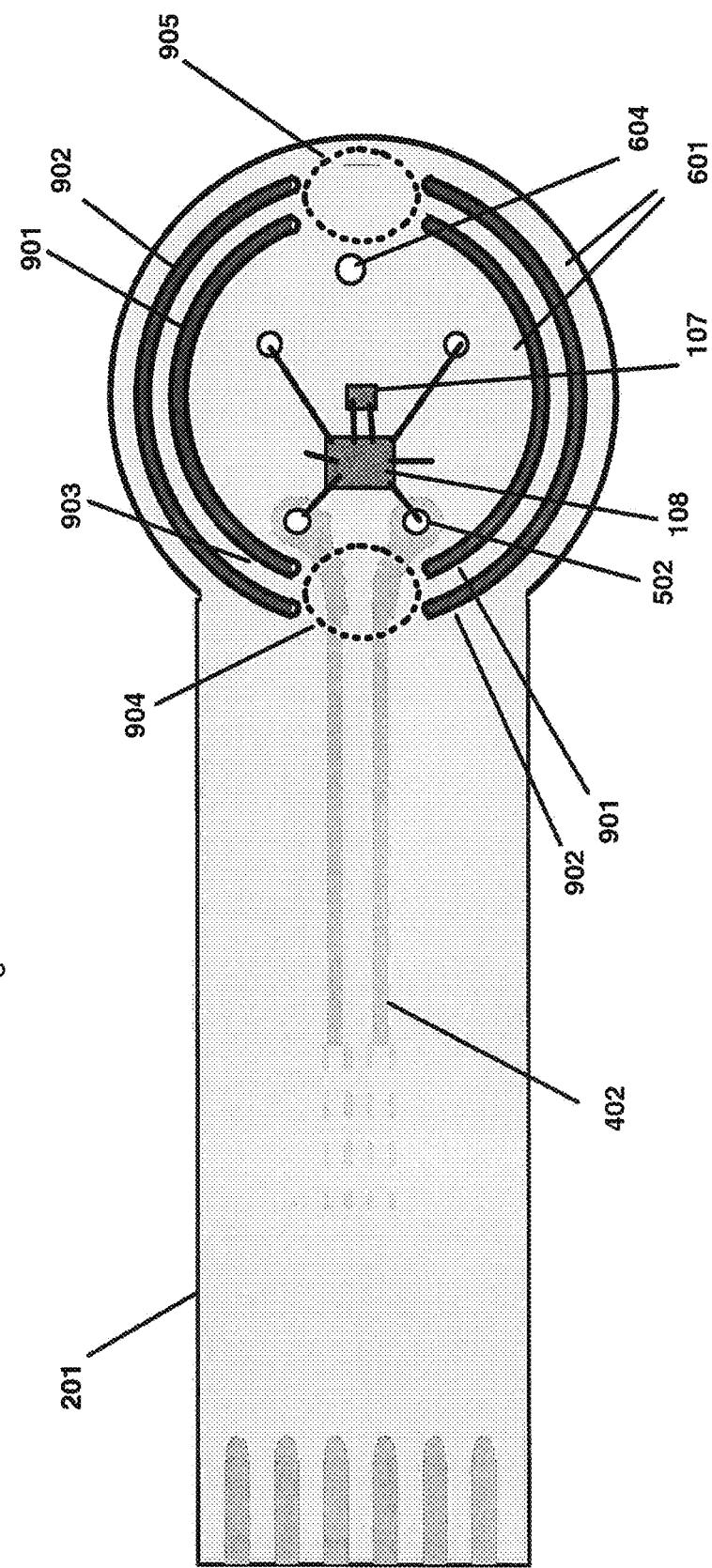
FIG. 9 shows a further assembly of components for part of a fibre optical receiver configured according to an embodiment of the present invention.

A possible embodiment of such a vent feature is shown in FIGS. 6 and 9.

For example with respect to FIG. 6, a hole 604 is shown cut in the PCB 201, in a similar manner to the holes 501 cut to permit bonding signal and power wires from the electronic an optoelectronic components to the signal and power traces on the opposite side of the PCB from the electronic components. In the case of the hole 604 cut specifically as a pressure vent, it is necessary to remove any conductive layer on the back of the PCB where said hole is to be formed. At some later point in the manufacturing process this hole 604 may be sealed by a convenient method to prevent the ingress of contaminating materials during the use and operating life of the complete ROSA.

FIG. 9 shows a top view of part of a further exemplar arrangement according to some embodiments to the invention. In some embodiments it may be preferable to ensure that the signal traces 402 on the back of the PCB, (here "back" refers to the opposite side of the PCB from the electronic and optoelectronic components) are placed underneath regions where there is a conducting layer on the top side of the PCB (where "top" refers to the same side of the PCB as the electronic, optoelectronic components and the cover) for as large a proportion of the said signal traces' lengths as possible. Typically, the conducting layer 601 on the top side of the PCB is connected to electrical ground. Maintaining a ground plane on the opposite side of the PCB from the signal traces is advantageous in meeting requirements for achieving defined characteristic impedances in the said signal traces. With a continuous ring 602 in the conductive layer 601 on the top of the PCB as shown in FIG. 6 there is clearly no way to maintain a continuous conducting layer on the opposite side of the PCB from the signal traces.

One arrangement that may be used to meet the requirement of a continuous conducting layer on the side of the PCB opposite to the side with the conducting signal traces is shown in FIG. 9. In this arrangement, the continuous isolated ring of conductive material is effectively replaced by a continuous ring 903 of the said first layer of the said first (conductive) material layer but without complete electrical isolation resulting from the continuous rings 603 of the said second layer of the said second (insulating) material where (in this exemplar embodiment) the said first layer of the said first (conductive) material has been removed.

In place of the said continuous rings 603 where the said first (conductive) layer has been removed, there are two pairs of regions 901, 902 that form symmetrically placed circular arcs where the said first (conductive) layer has been removed exposing the said second (insulating) layer, each of these said arcs being less than a full semicircle in length. It will be understood that in other embodiments employing alternative manufacturing processes, the said second layer of the said second material may be deposited in such circular arcs.

This first inner pair of arc shaped regions 901 of the said second (insulating) layer are placed in such a manner that each falls on opposite sides of a circular path having the same radius as the said arc shaped regions 901. A first region 904 where the said first (conductive) layer 601 on the top side of the PCB is left intact in the lateral central region of the PCB separating the inner pair of arc shaped regions 901 where the said first (conductive) layer has been removed to expose the second (insulating) layer. This region 904 of the said first (conductive) layer 601 on the top side of the PCB can form the conductive ground plane for signal traces 402 on the back side of the PCB in cases where it is required to have this ground plane for achieving a desired characteristic impedance or other requirements. There is a second gap region 905 where the said first (conductive) layer 601 on the top side of the PCB is left intact between the pair of the inner arc shaped regions 901 which has the same angular distance between the arc shaped regions 901 as the first gap region 904, and furthermore is placed symmetrically about the central point in the circular region on the PCB to be occupied by the sensitive area of the photodiode 107 with respect to the first gap region 904.

Similarly, a second outer pair of arc shaped regions 902 are placed in such a manner that each falls on opposite sides of a circular path having the same radius as the said second arc shaped regions 902. The first region 904 where the said first (conductive) layer 601 on the top side of the PCB is left intact in the lateral central region of the PCB also separates the said second outer pair of arc shaped regions 902, where the said first (conductive) layer has been removed to expose the said second (insulating) layer. The second gap region 905 where the said first (conductive) layer 601 on the top side of the PCB is left intact also separates the said second pair of the outer arc shaped regions 902 which has the same angular distance between the arc shaped regions 902 as the first gap region 904, and furthermore is placed symmetrically about the central point in the circular region on the PCB to be occupied by the sensitive area of the photodiode 107 with respect to the first gap region 904.

It will be apparent to one of ordinary skill in the art that the arrangement of areas of the said first (conductive) layer and areas where said first (conductive) layer has been removed to expose the said second (insulating) layer 901, 902, provides a means for the attachment of the said cover 501 and the said associated lens 305 arrangement to the PCB 201, by means of soldering or other suitable attachment process, in a manner that automatically aligns the lens with the photodiode at the same time as providing a continuous ground plane for high frequency signal traces on the back side of the PCB.

Figure 10:
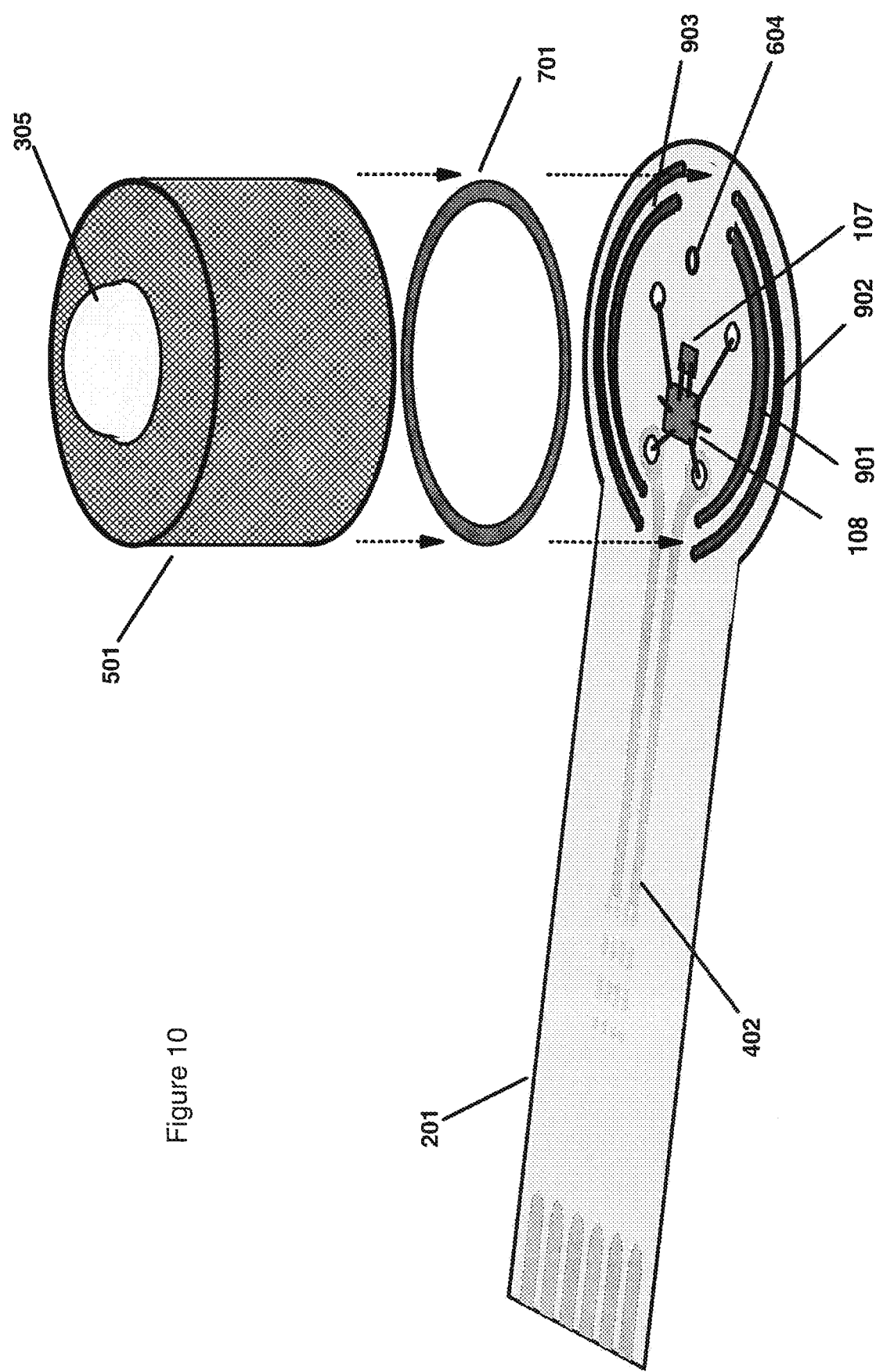
FIG. 10 shows a view of the means of assembling a further assembly of components for part of a fibre optical receiver configured according to an embodiment of the present invention.

FIG. 10 shows a method for the assembly of the arrangement described according to some embodiments of the invention. The pre-formed stamped ring of solder 701 is placed on the continuous ring of the first (conductive) layer 903 on the PCB 201 which is bounded for most of its inner and outer circumference by the arc shaped regions 901, 902 where the said first (conductive) layer 601 has been removed to expose the said second (insulating) layer. The metal cover 501 with the lens 305 is then placed on to the said ring of solder 701 and the components heated to form a solder bond. It will be apparent to one of ordinary skill in the arts that when the solder melts in the soldering process there will be surface tension effects due to the arc shaped regions 901, 902 on either side of the location of the solder ring, constraining the flow and spread of the molten solder. Since the region in which the solder can flow is substantially circular, and the regions where the flow and spread is less constrained, (in these exemplar embodiments in the regions 904 and 905) are symmetrically disposed with respect to the centre of the continuous ring of the said first (conductive) layer; it will be further apparent to one of ordinary skill in the arts that the forces exerted by the surface tension of the molten solder will be symmetrical with respect to the centre of the circular regions 903, 901, 902, and therefore symmetrical with respect the central location of the photodiode 107. Thus when the solder ring 701 melts, the metal cover 501 will be pulled into the correct alignment required for the photodiode 107. When the solder solidifies, the cover and associated lens will be securely attached to the PCB and provide the required mechanical rigidity for the region of the PCB carrying the electronic and optoelectronic components and further will be correctly aligned without any requirement for further adjustment or other actions from an assembly operative.

As described above with reference to FIGS. 6, 7 and 8, it is preferable to perform the soldering operation without the use of soldering flux and thus performing the assembly in a and inert or non-oxidising environment is preferable. Further, it is advantageous to provide for the release of pressure differences occurring inside the cover 501 assembly during the manufacturing process and thus some means for venting pressures may be provided, such as a vent hole 604 through the PCB 201 from within the metal cover 501.

Although the examples shown above present a situation wherein the first layer is etched to reveal the second layer, it is understood that in some embodiments the first layer may be deposited onto the second layer using any suitable known assembly process. In some further alternative embodiments the second layer may be deposited onto the first layer using any suitable known assembly process.

Figure 11:
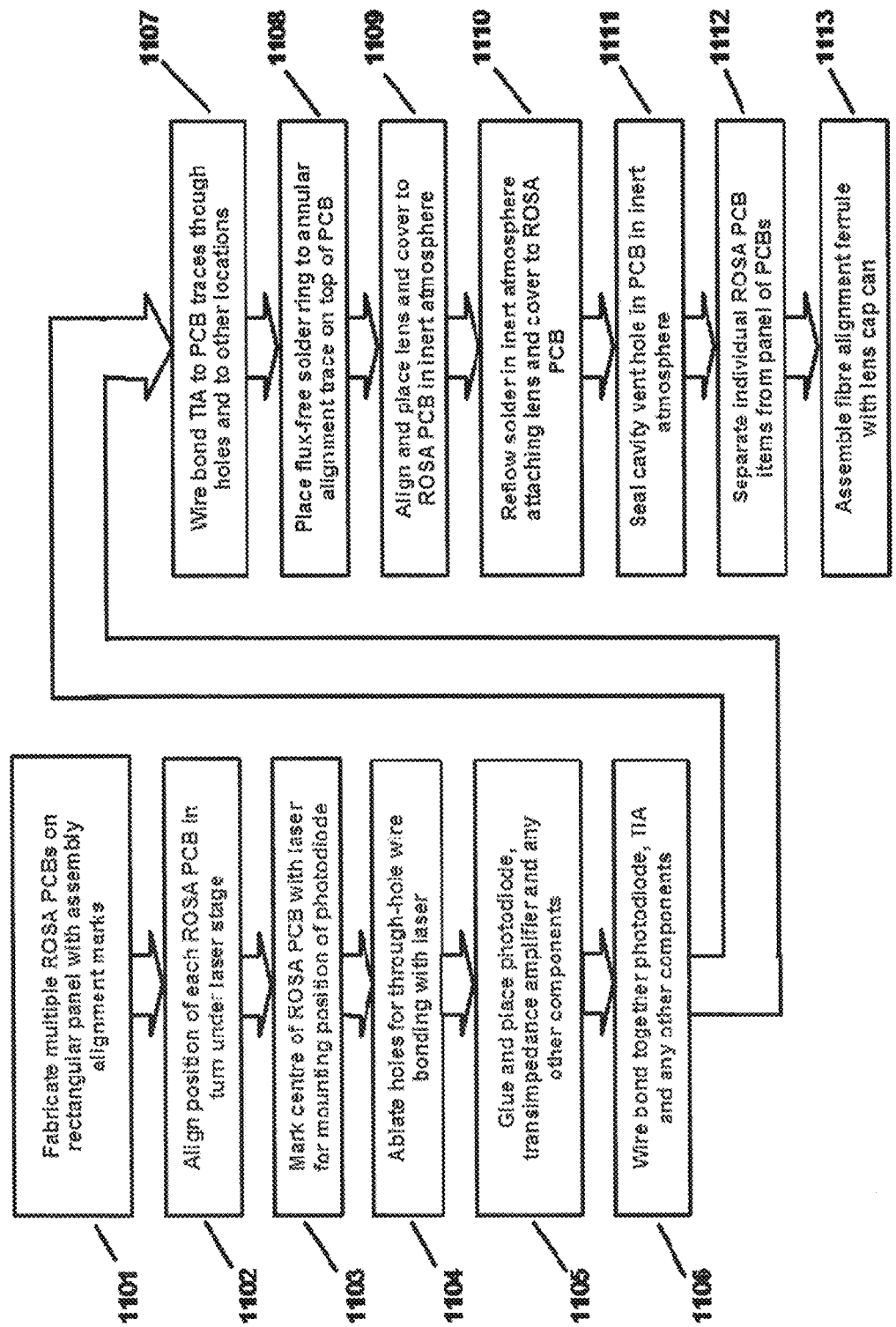
FIG. 11 shows a procedure for the method of assembly of components according to some aspects of the invention.

FIG. 11 shows an exemplar method for the assembly of components according to some embodiments of the invention, wherein soldering is used as the method of attachment of the cover 501. It will be understood that many variations of this method and other different methods are possible to achieve the objectives of the invention.

Thus there is a first operation of fabricating multiple ROSA PCBs on a regular panel with assembly alignment marks as shown in FIG. 11 by step 1101.

Then the position of each ROSA PCB 201 is aligned in turn under a laser stage as shown in FIG. 11 by step 1102.

Then the centre of each ROSA PCB is marked with a laser to indicate the mounting position of photodiode as shown in FIG. 11 by step 1103.

Then the holes for through-hole wire bonding are formed by ablating the PCB insulating material with a laser wire as shown in FIG. 11 by step 1104.

Then the photodiode 107, (transimpedance) amplifier 108 and any other components are placed and affixed to the PCB with glue or by other suitable means at their designated positions as shown in FIG. 11 by step 1105.

Next, the photodiode, (transimpedance) amplifier and any other components are electrically connected together and to the PCB traces and ground plane by means of wire bonding as shown in FIG. 11 by steps 1106 and 1107.

Next, a ring of flux-free solder 701 is placed on the continuous ring of the first (conductive) material 602 on the top side of the PCB as shown in FIG. 11 by step 1108.

Then, the cover 501 together with the lens 305 is aligned and placed on the solder ring, preferably in an inert atmosphere, as shown in FIG. 11 by step 1109.

Next, while maintaining the inert atmosphere, the solder is caused to reflow by heating the components, during which process the surface tension of the molten solder causes the cover and lens to become correctly aligned and permanently attached as shown in FIG. 11 by step 1110.

Next, following this heating process and subsequent cooling, the vent hole 604 in the PCB is sealed with the inert atmosphere inside the cap can at ambient pressure, as shown in FIG. 11 by step 1111.

Next, the individual ROSA PCBs are separated from the panel of multiple instances of the PCB as shown in FIG. 11 by step 1112.

Lastly, the fibre alignment ferrule 204 is assembled with the cover 501 and lens 305 as shown in FIG. 11 by step 1113.

Whilst this invention has been described with reference to particular examples and possible embodiments thereof, these should not be interpreted as restricting the scope of the invention in any way. It is to be made clear that many other possible embodiments, modifications and improvements may be incorporated into or with the invention without departing from the scope and spirit of the invention as set out in the claims.

The invention claimed is:

1. An assembly of electronic components for reception of data using an optical fibre wherein said assembly comprises:
   a photodiode;
   an amplifier coupled to said photodiode
   a printed circuit board, said photodiode and amplifier physically mounted on said printed circuit board; wherein said printed circuit board has areas of a conductor to which components may be attached using a fixing agent, and areas of an insulator to which components will not attach using said fixing agent; and
   conducting bond wires configured to directly couple said amplifier and said photodiode to conducting traces on an opposite side of said printed circuit board with respect to said amplifier and said photodiode; and
   a cover, said cover configured to cover said amplifier and said photodiode, wherein said cover is physically attached to said printed circuit board so as to provide mechanical rigidity around said photodiode and said amplifier, and said cover having an optically transparent aperture containing a lens configured to focus modulated light signals from a fibre onto said photodiode, and
   wherein said printed circuit board has areas of said conductor and said insulator which are configured to fix a position of said cover by use of said fixing agent such that said lens is aligned to focus said light signals from said fibre onto said photodiode.

2. The assembly as claimed in claim 1, wherein said assembly further comprises ancillary electronic components mounted on said printed circuit board and covered by said cover.

3. The assembly as claimed in claim 1, wherein an area of said conductor has a region whose outline is configured to substantially match an outline of a contact region of a base of said cover and said region of said conductor is bounded on its inside and outside edges by areas of said insulator.

4. The assembly as claimed in claim 3, wherein said fixing agent has significant surface tension at a time of initial attachment before cured or set.

5. The assembly as claimed in claim 3, wherein said areas of said conductor and said insulator are arranged in a concentric manner around a position of said photodiode.

6. The assembly as claimed in claim 1, wherein said cover comprises one of:
   a metal can structure; and
   a plastic can structure.

7. The assembly as claimed in claim 1, wherein said printed circuit board is a flexible printed circuit board.

8. The assembly as claimed in claim 1, wherein said conductor is a conducting metal layer and wherein said conductor is an insulating layer.

9. The assembly as claimed in claim 8, wherein said areas of said insulator bordering said region of said conductor to which said cover and said lens are to be attached are separated to provide a continuous region of said conductor over signal traces on said opposite side of said printed circuit board.

10. The assembly as claimed in claim 9, wherein said areas of insulator bordering said area of conductor to which said cover is to be attached are separated to provide said continuous region of conductor disposed symmetrically opposite said continuous region of conductor claimed in claim 9 with respect to a position of said photodiode.

11. The assembly as claimed in claim 1, wherein a vent hole is provided to allow gas pressure differences between an inside of said cover and an external atmosphere to be released.

12. The assembly as claimed in claim 1, wherein electrical connections between electronic and optoelectronic components within said cover and said traces on said opposite side of said printed circuit board with respect to said components are made by one of:
at least one plated through holes; and
at least one hole through which a bond wire is connected.

13. The assembly as claimed in claim 1, wherein said conductive traces are laid out in a manner that minimises impedance discontinuities in an electrical path between said electronic components and an edge of said printed circuit board.

14. The assembly as claimed in claim 1, wherein said fixing agent is solder.

15. A method of assembly of electronic components for reception of data using an optical fibre, said method comprising:
providing a printed circuit board;
physically mounting on said printed circuit board a photodiode and an amplifier;
providing on said printed circuit board at least one conductive trace from an edge of said printed circuit board to at least one region of said board on which said amplifier and said photodiode are mounted;
providing conducting bond wires configured to directly couple said amplifier and said photodiode to conducting traces on an opposite side of said printed circuit board with respect to said amplifier and said photodiode;
providing on said printed circuit board holes through said board configured to provide electrical connection between opposite sides of said printed circuit board;
providing a cover for said photodiode and said amplifier, said cover having an optically transparent aperture containing a lens configured to focus modulated light signals from a fibre onto said photodiode, and said cover being configured to be able to be attached to areas of said printed circuit board by a fixing agent;
providing on said printed circuit board areas of a conductor and areas of an insulator configured for attachment of said cover wherein said fixing agent can adhere to said conductor and wherein said fixing agent will not adhere to said an insulator, and wherein said areas of said conductor and said an insulator are disposed on the printed circuit board so as to fix a position of said cover when said cover is attached to said printed circuit board so that said lens in said cover will be correctly aligned with said photodiode;
physically attaching said cover to said areas of said conductor on said printed circuit board using said fixing agent and over said photodiode, said cover being configured to provide mechanical rigidity around said photodiode and said amplifier; and
coupling said amplifier and said photodiode to said conducting traces on said printed circuit board.

16. The method of assembly of electronic components as claimed in claim 15 wherein said cover comprises one of:
a metal can structure; and
a plastic can structure.

17. The method of assembly of electronic components as claimed in claim 15 wherein said printed circuit board is a flexible printed circuit board.

18. The method of assembly of electronic components as claimed in claim 15 wherein said conductor on said printed circuit board comprises a layer of metal, said metal being compatible with soldering, and said insulator on said printed circuit board comprises an insulating substrate.

19. The method of assembly of electronic components as claimed in claim 15 wherein said cover is attached to said first areas of said printed circuit board by said fixing agent, and wherein said fixing agent is configured to provide significant surface tension effects before curing or setting or solidifying during said process of attachment of said cover to said areas of said conductor.

20. The method of assembly of electronic components as claimed in claim 15 wherein said areas said insulator are configured so that there are areas of said insulator symmetrically disposed on either side of an area of said conductor, said conductor has a region whose outline is configured to substantially match an outline of a contact region of a base of said cover, and said areas of said insulator further configured to provide a continuous area of said conductor above said conductive traces said continuous areas being such as to provide an electrical ground plane for said traces.

* * * * *